(12) United States Patent
Cabrita (10) Patent No.: US 9,305,403 B2
(45) Date of Patent: Apr. 5, 2016

(54) CREATION OF A PLAYABLE SCENE WITH AN AUTHORING SYSTEM

(75) Inventor: Francisco Cabrita, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 236 days.

(21) Appl. No.: 13/323,596

(22) Filed: Dec. 12, 2011

(65) Prior Publication Data

US 2012/0162210 A1    Jun. 28, 2012

(30) Foreign Application Priority Data

Dec. 24, 2010  (EP) .................................... 10016070

(51) Int. Cl.
*G06T 19/20* (2011.01)

(52) U.S. Cl.
CPC ......... *G06T 19/20* (2013.01); *A63F 2300/6018* (2013.01); *A63F 2300/6661* (2013.01); *G06T 2219/2004* (2013.01); *G06T 2219/2016* (2013.01)

(58) Field of Classification Search
CPC ............... G06F 3/0486; G06F 17/246; G06F 17/30265; G06T 11/206; G06T 11/60; G06T 11/001
See application file for complete search history.

(56) References Cited

U.S. PATENT DOCUMENTS

2006/0048092 A1*  3/2006  Kirkley et al. ................ 717/100
2008/0163055 A1*  7/2008  Ganz et al. .................... 715/706

OTHER PUBLICATIONS

Abdullah, N. et al., "An Authoring Toolkit Design for Education Game Content," Information Technology, 2008. ITSIM 2008, International Symposium On, 1-6 (Aug. 26, 2008).*
European Search Report for European Patent Application EP 10016070 dated Apr. 11, 2011.
Sauer, S. et al., "U-Create: Creative Authoring Tools for Edutainment Applications," *Technologies for Interactive Digital Storytelling and Entertainment Lecture Notes in Computer Science*, 4326:163-168 (Jan. 1, 2006).
Chang, H., et al., "Interactive Video Game Platform for Game-Based Learning," *Advances in Web Based Learning—ICWL 2008*, 5145:232-240 (Aug. 20, 2008).

* cited by examiner

*Primary Examiner* — Maurice L McDowell, Jr.
*Assistant Examiner* — Raffi Isanians
(74) *Attorney, Agent, or Firm* — Hamilton, Brook, Smith & Reynolds, P.C.

(57) ABSTRACT

The invention is directed to a process for creating a playable scene with an authoring system, the process comprising the steps of: (a) displaying a three-dimensional authoring scene comprising representations of objects displayed thereon, one of the representations of objects being a three-dimensional experience scene; (b) displacing, upon user action, some of the representations of objects displayed in the authoring scene to the experience scene; and (c) organizing, upon user action, the displaced representations of objects in the experience scene.

12 Claims, 7 Drawing Sheets

CREATION OF A PLAYABLE SCENE WITH AN AUTHORING SYSTEM

RELATED APPLICATION(S)

This application claims priority under 35 U.S.C §119 or 365 to European Application No. 10016070.4, filed Dec. 24, 2010.

The entire teachings of the above application(s) are incorporated herein by reference.

FIELD OF THE INVENTION

The invention relates to the field of authoring tools for creating playable content such as three-dimensional scenes, video games, virtual reality, simulation, and the like, using a computer system.

BACKGROUND

Authoring systems are known to include a collection of tools that allows an author to configure objects in a simulated universe such as a three-dimensional (3D) scene or a video game. The author can for instance configure the object, e.g. specify usual and unusual behaviours of the objects. The end result provided by the authoring system is a content that is playable by an end-user, e.g. a customer or a spectator. Typically, this playable content has to be loaded into a dedicated interpreter.

In general, a 3D scene comprises one or more 3D objects located in a background in order to create an image or an animated 3D movie. These 3D objects and the background form the graphic elements of the 3D scene.

The 3D scene further embodies characteristics that affect its appearance. A first category of characteristics is made by types and locations of light sources that may be used as desired to create different effects in the scene such as specular reflections on the objects, shadows, and so on. Another category of characteristics comprises the viewpoint of the 3D scene—which represents the relative point of view of the viewer and which may be seen as what would be seen through a camera—that may be changed (one could also say that the viewpoint is moved) in the 3D space so that a change of the viewpoint modifies how the scene appears to the viewer.

The objects in a 3D scene may have characteristics such as colour, texture and/or material composition which affect how the objects and the 3D scene appear to the viewer. The representation of the 3D scene is the result of a rendering (also referred as 3D rendering) which is usually defined as a process of generating an image from data that describes the image or the animated 3D movie, thus forming a model.

Conventional systems used to create a 3D scene are specifically designed for that purpose and they relies on a mixed two-dimensional (2D)/three-dimensional user interface. The author is immersed in 2D user interface while constructing the scene, and then the author switches to the 3D scene in order to experience the 3D scene, that is, in order to play the 3D scene. The 2D user interface is a classical interface; for instance, a graphical user interface (or GUI) having standard menu bars as well as bottom and side toolbars that contain a set of user-selectable icons, each icon being associated with one or more operations or functions.

Thus, the author often needs to switch from the 2D user interface to the 3D user interface when creating the 3D scene in order to be able to check that the result displayed in the 3D scene is the expected one. This is a cumbersome tack for the user because it is time consuming and not ergonomical.

Furthermore, in order to effectively generate 3D scenes, the author needs to acquire a considerable amount of knowledge, training and expertise in order to limit back and forth between the 2D and 3D user interface. As a result, the creation of a 3D scene using conventional systems is a slow and difficult process.

Furthermore, the workspace of the 2D user interface has a limited size. As a result, the number of standard menu bars as well as bottom and side toolbars functions is limited. Therefore, the author is compelled to navigate between complex menus and sub-menus which are difficult to comprehend; thus requiring again considerable amount of knowledge, training and expertise for designing a playable scene.

Thus, according to the limitations of the existing solution shortly discussed above, there is a need for a process for creating a playable scene in an authoring system that improves the ergonomy and reduces the production time of the playable scene.

SUMMARY OF THE INVENTION

In one embodiment, the invention therefore provides a process for creating a playable scene with an authoring system, the process comprising the steps of:

displaying a three-dimensional authoring scene comprising representations of objects displayed thereon, one of the representations of objects being a three-dimensional experience scene;

displacing, upon user action, some of the representations of objects displayed in the authoring scene to the experience scene;

organizing, upon user action, the displaced representations of objects in the experience scene.

In other embodiments, the process for creating a playable scene with an authoring system according to the invention may comprise one or more of the following features:

computing an instance for each one of the objects to be displayed in the authoring scene; and wherein the step of displacing further comprises displacing without duplication the representations of objects;

configuring, upon user action, configurations of objects represented in the three-dimensional authoring scene or in the three-dimensional experience scene, the configuration of an object being unchanged when displaced from the authoring scene to the experience scene;

the configuration of an object comprises a behaviour of said object with at least another object;

a change of a viewpoint in the three-dimensional authoring scene affects the viewpoint in the three-dimensional experience scene accordingly;

the viewpoint in the three-dimensional authoring scene is independent to the viewpoint in the three-dimensional experience scene displaying, upon user action, a set of local tools in the authoring scene or in the experience scene for configuring an object represented in the authoring scene or in the experience scene;

displaying a set of global tools for configuring the three-dimensional authoring scene or the three-dimensional experience scene;

local tools or the global tools are objects whose respective representations are displayed;

at the step of organizing, the viewpoint enters the experience scene for displaying only the experience scene and the representations of objects displaced thereon;

the step of displaying representations is carried out at a build-time, and the steps of displacing and organizing are carried out at a run-time;

the objects are three-dimensional modeled objects.

The invention further proposes a computer program for creating with an authoring system a playable scene, comprising code means for causing a computer to take the steps of the process of the invention.

The invention still concerns a computer readable storage medium having recorded thereon a computer program for creating with an authoring system a playable scene, comprising code means for causing a computer to take the steps of the process of the invention.

The invention also concerns an authoring system for creating a playable scene, the authoring system comprising means for implementing the steps of the process of the invention.

BRIEF DESCRIPTION OF THE DRAWINGS

A system embodying the invention will now be described, by way of non-limiting example, and in reference to the accompanying drawings, where.

DETAILED DESCRIPTION OF THE EMBODIMENTS

The invention is directed to a process for creating a playable scene with an authoring system. The playable scene is created by an author. The playable scene is a three-dimensional (3D) scene with which an end-user is allowed to interact or play with. The process according to the invention comprises a step of displaying a 3D authoring scene to the author, the 3D authoring scene being a 3D space wherein the author gathers and (optionally) configures objects that will be part of the playable scene. The 3D authoring scene comprises representations of objects displayed thereon, one of the representations of objects being a three-dimensional experience scene. The 3D experience scene is 3D space wherein the author creates the playable scene and wherein the end-user is allowed to play the playable scene. The process further comprises a step of displacing, upon action of the author, some of the representations of objects displayed in the authoring scene to the experience scene. Then, still upon action of the author, the representations of objects displaced in the experience scene are organized.

The process according to the invention advantageously provides a permanent immersion between 3D authoring scene (or authoring user interface) and the 3D experience scene wherein the end-user plays the playable scene, the playable scene being the scene designed by the author for the end-user. Indeed, the 3D experience scene is an object of the 3D authoring scene and it is therefore part of the 3D authoring scene: consequently, going back and forth between 3D authoring scene and 3D experience scene is made in a seamless way. In consequence, the author can stay immersed in the same 3D space (the authoring space) while creating the playable scene, thus removing the need of switching between a traditional authoring 2D user interface and the playable scene. In other terms, the author can use and see the authoring and experience scene at same time and work on it in a seamless way.

In addition, the process according to the invention provides an infinite 3D space available for the 3D authoring scene without losing any space for the experience. This is possible thanks to the separation between the two spaces in a seamless way. Advantageously, the user has an unlimited space for placing tools and objects, which improves the ergonomy for creating the playable scene.

For the sake of the explanation, a 3D space is three-dimensional universe defined by a coordinate system, generally a Cartesian coordinates. The 3D space can incorporate geometric models. Incidentally, other ways of describing three-dimensional space exist.

Figure 1:
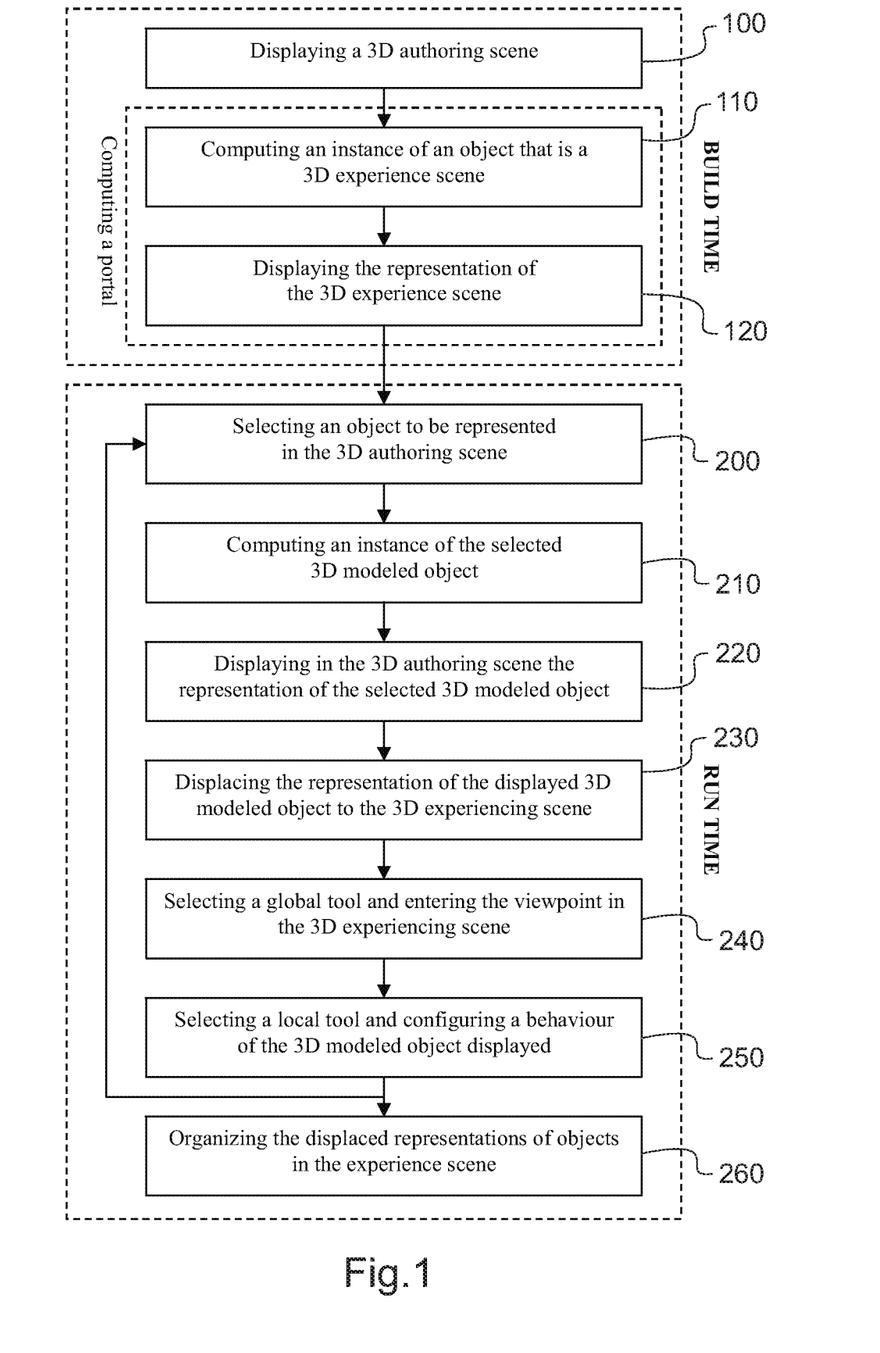
FIG. 1 is a flowchart of a process for creating a playable scene for carrying out the invention.

In FIG. 1 is shown a flowchart of a process for creating a playable scene. Note that the process hereafter described in reference to FIG. 1 relates to a specific way of creating a playable scene, notably the computation of a portal at steps 110-120. Nonetheless, a description of said process will be useful for understanding the invention.

The process of FIG. 1 broadly decomposes as a build time (comprising steps 100, 110, 120) and a run time (steps 200-260).

The build time notably comprises processing steps 110-120, mainly dedicated to the computing of a portal. These steps 110-120 occur preferably during the build time, thus avoiding repetitions.

The concept of "portal" is well-know in video-games. Portal is often use to optimize the rendering overdraw of indoor scenes (typically when too many objects are drawn), but portal is also used to create a gate through another place in the game. Importantly, a portal is not only a basic mapping of the rendering of a sub-part of a scene (also referred to as render to texture): indeed, a portal displays a real window to another part of the scene, so the perspective of what is displayed inside the portal changes according to the camera viewpoint outside the window. The concept of portal allows the displacement of objects from the one side of the portal to the other side of the portal.

The process depicted on FIG. 1 starts with the display 100 of a 3D authoring scene. The 3D authoring scene is a 3D scene wherein the author gathers and (optionally) configures objects that will be part of the playable scene. A 3D scene is defined as a 3D repository space wherein objects are located.

Next, at step 110, an instance of an object for creating a 3D experience scene is computed. This object comprises the necessary instructions for specifying several characteristics of the 3D experience scene such the background, lightings, and so on. The instantiation of the object for creating a 3D experience scene is performed as known in the art.

Once the 3D object for creating the 3D experience scene is instantiated, its representation can be displayed in the 3D authoring scene (step 120). The 3D experience scene is an object of the authoring scene, and it is therefore part of the 3D authoring scene: the author can advantageously go back and forth between 3D authoring scene and 3D experience scene in a seamless way. This can be achieved by going through the portal. In other words, the camera can navigate from the 3D authoring scene to the 3D experience scene.

The representation of the 3D experience scene is displayed in the 3D authoring scene via a portal effect which is created in the 3D authoring scene. The objects can be instantiated in the 3D authoring scene and displaced from the 3D authoring scene to the 3D experience scene and thus viewed through the portal.

Figure 11:
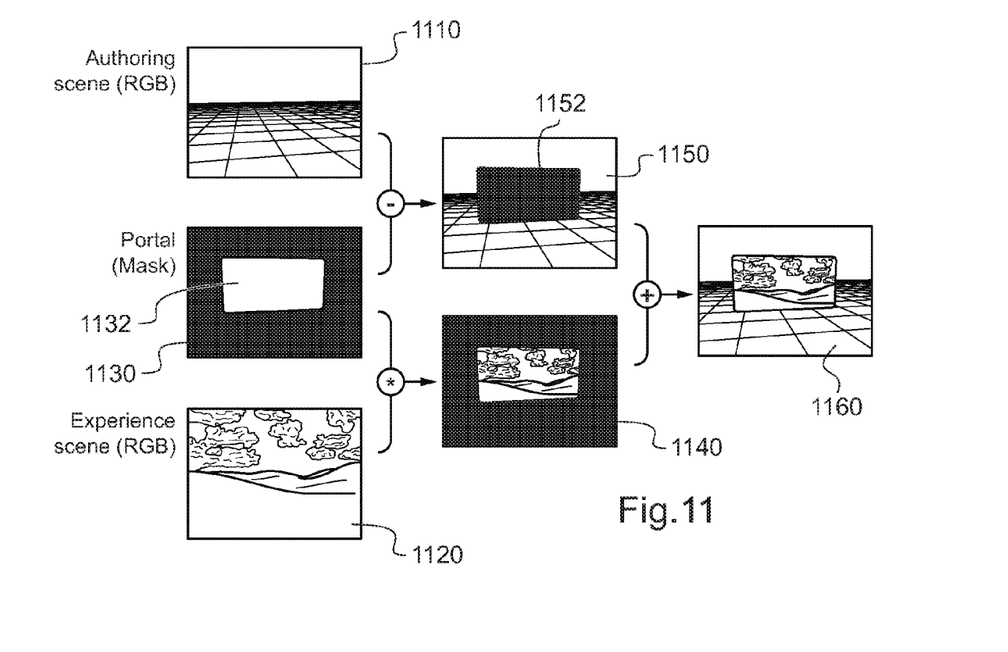
FIG. 11 is a schematic view of an example of a method for creating a portal.

Referring now to FIG. 11, a method for creating a portal is depicted. The method depicted on FIG. 11 relies on the rendering of both the 3D authoring 1110 and experience 1120 scenes from the exact same viewpoint, each scene having its own RGB buffer that stores information of the RGB (red, green, blue) color model.

The 3D experience scene is combined with a mask (or portal mask) 1130 in order to provide a limited view of the 3D experience scene 1140; in other terms, only a part of the 3D experience scene can be seen. The limited view of the 3D experience scene 1140 may be obtained by multiplying, pixel by pixel, the representation of the 3D experience scene 1120 with a representation of the mask 1130.

The 3D authoring scene 1110 is also combined with the same mask 1130 in order to obtain a 3D authoring scene 1150 having an empty (or black) area 1152 that corresponds to the (white) area 1132 of the mask 1130. The representation of the 3D authoring scene 1110 is thus modified, and this modification may be obtained by subtracting, pixel by pixel, the representation of the 3D authoring scene 1110 with a representation of the mask 1130.

Finally, the representation of the 3D authoring scene having the representation of the 3D experience scene displayed thereon 1160 via a portal effect is created by adding up the pixels of the limited view of the 3D experience scene 1140 with the pixels of the modified 3D authoring scene 1150.

Figure 2:
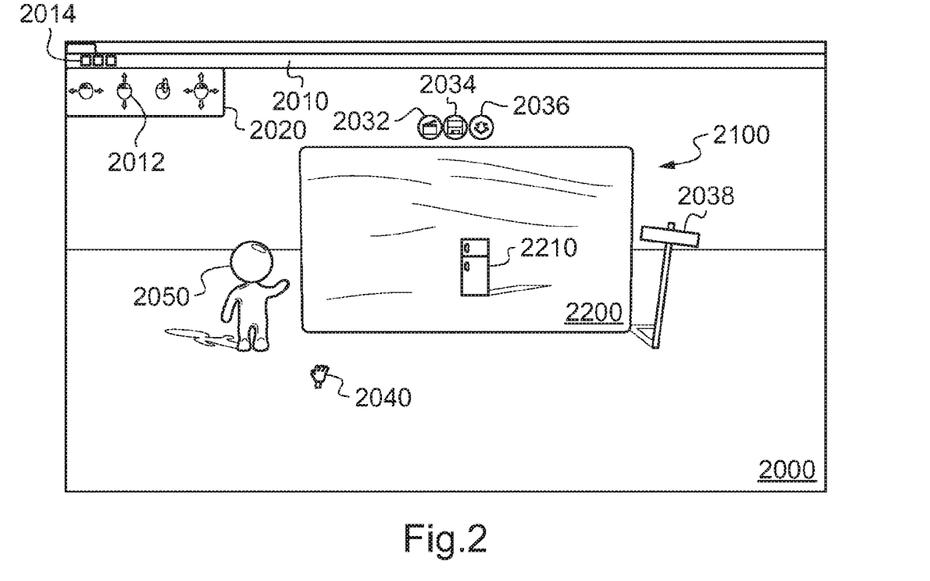
FIGS. 2 to 10 are examples of views of a process for creating a playable scene for according to the invention.

FIG. 2 shows an example of a view in a graphical user interface (or GUI) of the result of the steps 100-120 of the process of FIG. 1. The GUI has standard menu bar 2010 as well as bottom and toolbar 2020. Such menu and toolbar contain a set of user-selectable icons 2012, 2014, each icon being associated with one or more operations or functions, for example for facilitating 3D orientation of the 3D authoring scene 2000 displayed in the GUI. The GUI further displays a cursor 2040 (having the general shape of a hand) used by the author to perform actions in the GUI, e.g. selecting a function. The cursor may be operated via a haptic device such as a keyboard, a mouse, a stylus, or the like. In a variant, the author may also perform action in the GUI via a touch sensitive screen that displays the GUI.

The 3D authoring scene 2000 comprises a portal 2100 wherein a representation of the 3D experience scene 2200 is displayed. The 3D experience scene may comprise one or several objects displayed by default thereon, e.g. the fridge 2210. Importantly, a change of the viewpoint in the 3D authoring scene affects the viewpoint in the 3D experience scene accordingly: indeed, the portal 2100 displays a real window to another part of another scene 2200, so the perspective of what is displayed inside the portal changes according to the viewpoint outside the portal (that is, according to the viewpoint of the 3D authoring scene).

In addition, the 3D authoring scene 2000 may further comprise a set of global tools for configuring the three-dimensional authoring scene or the three-dimensional experience scene. These global tools may be associated with one or more operations or functions such as, but not limited to, triggering 2032 the playable scene, saving 2034 the experience scene, searching 2038 an object to be displayed in an object library, entering 2036 the 3D experience scene, or facilitating 2050 3D orientation of the 3D authoring scene 2000 displayed in the GUI. Entering the 3D experience scene means that the author only see the experience scene. In other term, the viewpoint in the three-dimensional authoring scene and the viewpoint in the three-dimensional experience scene are independent.

In practice, the global tools 2032, 2034, 2036, 2038 are objects whose respective representations are displayed in the 3D authoring scene. Preferably, these objects are part of the 3D authoring scene, and they are therefore instantiated while displaying the authoring scene, that is, during the build-time 100-120. Incidentally, the global tools may also be displayed in the 3D experience scene, typically after entering in the experience scene.

Figure 3:
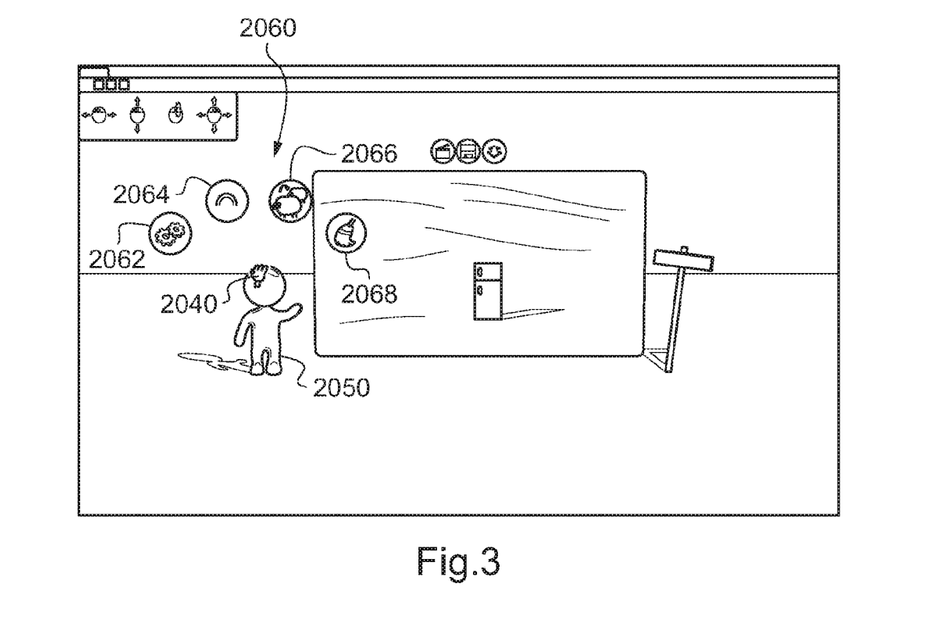

A global tool may also provide a set of sub functions, as illustrated on FIG. 3. The author selects the global tool 2050 by acting on it (for instance by clicking on the global tool with the cursor 2040), and then the global tool shows a menu 2060 comprising a set of user-selectable functions 2062-2068. Each user-selectable function 2062-2068 forming the menu 2060 may be an object whose representation is displayed in the 3D authoring scene.

Referring back to FIG. 1, the build time (100-120) of the process for creating a playable scene is achieved, and the run time of the process 200-260 is now discussed, in reference with FIGS. 2-10.

At step 200, the author selects an object to be represented in the 3D authoring scene. Here, various selection schemes of objects are available, including selection upon author action through a list of the set of the objects or selection through a set of representation of objects directly displayed in the authoring scene. Any selection scheme may be performed thanks to any kind of user interface such as a combo-box, icons, a special command or a right click, and so on.

Figure 4:
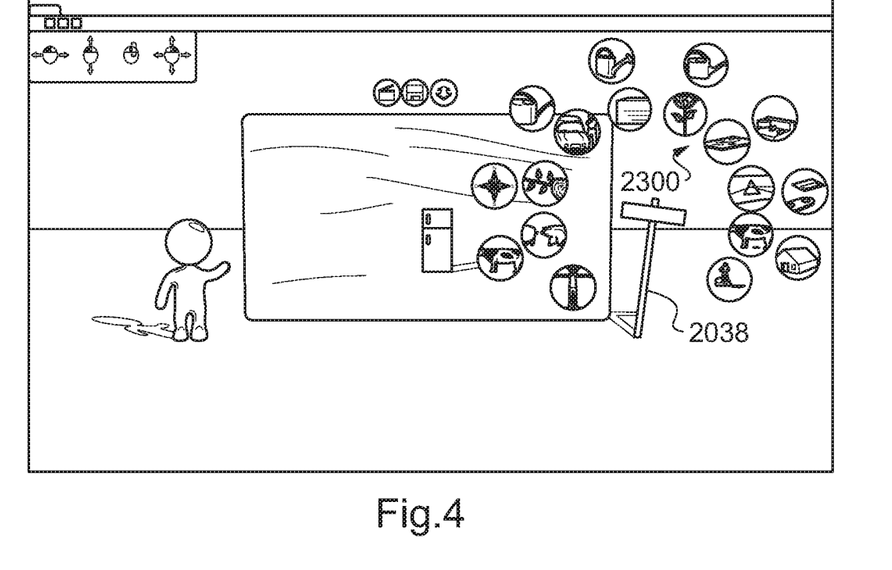

Preferably, the selection of an object is performed via the search tool 2038 that provides a set of objects, as illustrated on FIG. 4. In the proposed example, the author inputs identification information in the search tool which serves to identify the requested object (e.g. "pink"). In response to the input of identification information, the search tool displays a set of objects 2300. The displayed objects are actually objects stored in a repository such as a database. For this purpose, the search tool may use a relational property of the database for identifying all objects in the repository that are related to identification information. Once the objects are identified, their representations are displayed in the 3D authoring scene: a set of representation of objects 2300 is shown. Finally, the author selects the object they wants to be represented in the 3D authoring scene.

In addition, the representation of each object may be pre-computed. This reduces computation time. Pre-computing the representations is possible, at least for some of the representations that are expected to be repeatedly used in the repository. Such pre-computed representations may be computed off the fly and may be stored for access. If a given representation is to be displayed, it would first be searched among the representations already stored; if the representation to be displayed is not present, it would then be computed.

Referring back to FIG. 1, once the object is selected by the author, an instance of the selected object is computed (step 210). The computation of the instance is performed as known in the art.

Then, a representation of the selected object is displayed (step 220) in the 3D authoring scene; this amounts to say that a representation of the instantiated object is displayed.

In practice, objects are three-dimensional modeled objects. A 3D modeled object is a description of an object in a 3D space. A 3D modeled object refers essentially to specifications, from which geometry is generated. A 3D modeled object is thus a mathematical description depicting of a 3D object, that is, a collection of points in 3D space, connected by various geometric entities such as triangles, lines, curved surfaces, etc. A 3D modeled object is represented by a 3D representation of the 3D modeled object.

Figure 5:
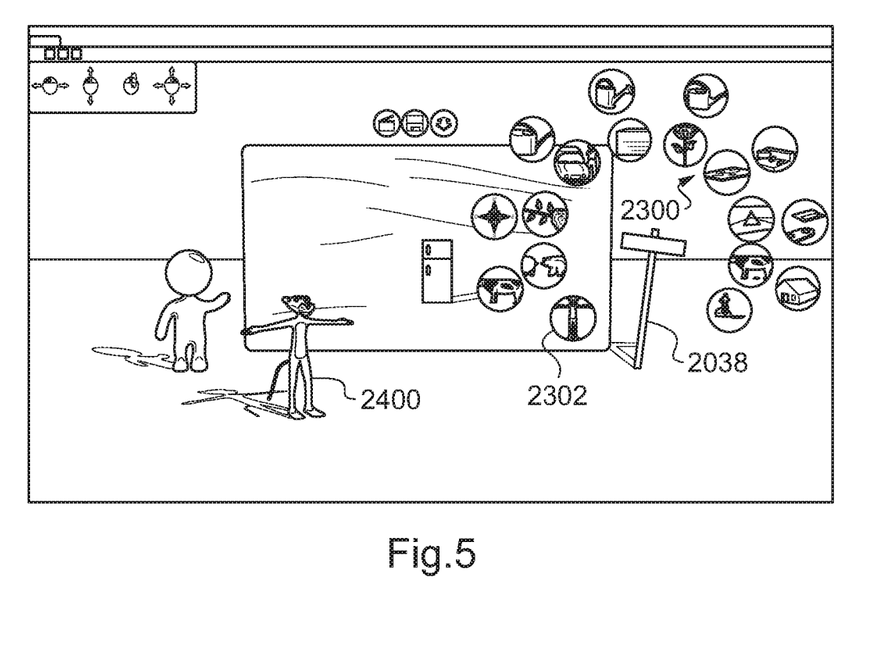

FIG. 5 illustrates the displaying of step 220. The user has selected the object 2302 (a panther) provided by the search engine, as illustrated on FIG. 4. An instance of this selected object has been computed and the representation 2400 of this object is displayed in the 3D authoring scene. The representation of the object 2400 is a 3D representation as the selected object is a 3D modeled object of a panther. It is noticeable that the selected object 2302 is still displayed, even after that the representation of the object 2400 is displayed on the 3D authoring scene. It is thus possible to select the same object 2302 several times, compute instances of the selected object, and display several representations similar to the representation of the object 2400.

The steps (200, 210, 220) of selecting an object, computing the instance of the selected object, and displaying the selected object may be sequentially performed several times. By this way, the author can store in the authoring scene all the objects he needs for creating the playable scene. Advantageously, the 3D authoring scene provides unlimited space for temporary storing the objects and organizing them in the best way for the author (e.g. by object size or object shape), which improves the ergonomy for creating the playable scene.

Next; at step 230, the author displaces a representation of objects displayed in the authoring scene to the experience scene. Preferably, the displacing of the object may be performed by several ways, for instance by using a technique called "drag and drop". Alternatively, the author can achieve the same results by employing a similar conventional technique, called "cut" and "paste".

Importantly, when an object is displaced from the 3D authoring scene to the 3D experience scene (and inversely), the instance of the object is unchanged inasmuch as both the displaced object and the 3D experience scene are objects instantiated in the common 3D authoring scene. In addition, the representation of the object (and its instance) is not duplicated when the object is moved from the authoring scene to the experience scene or when moved from the experience scene to the authoring scene. In other words, the single instance of the object is moved without duplication from one scene to the other one.

Advantageously, this makes easier the sharing of pieces of code created for one scene into the other scene as no supplementary computation is required, thus limiting the consumption of computational resources (random access memory, computer processing unit) of a computerized system running the process of the invention.

Figure 6:
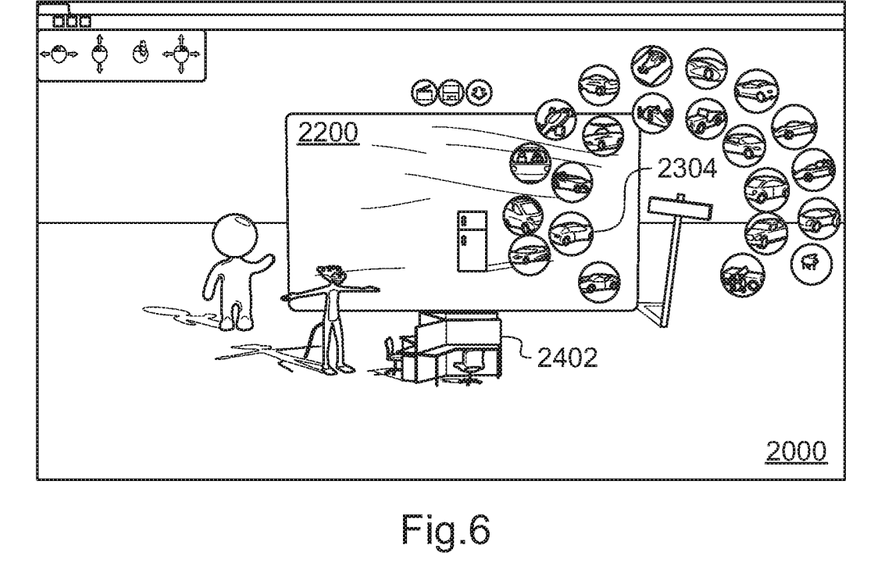

Referring now to FIG. 6, a new object 2402 is represented on the 3D authoring scene 2000. The author has also performed a search for objects related to identification information "car", and the user is selecting the object 2304.

Figure 7:
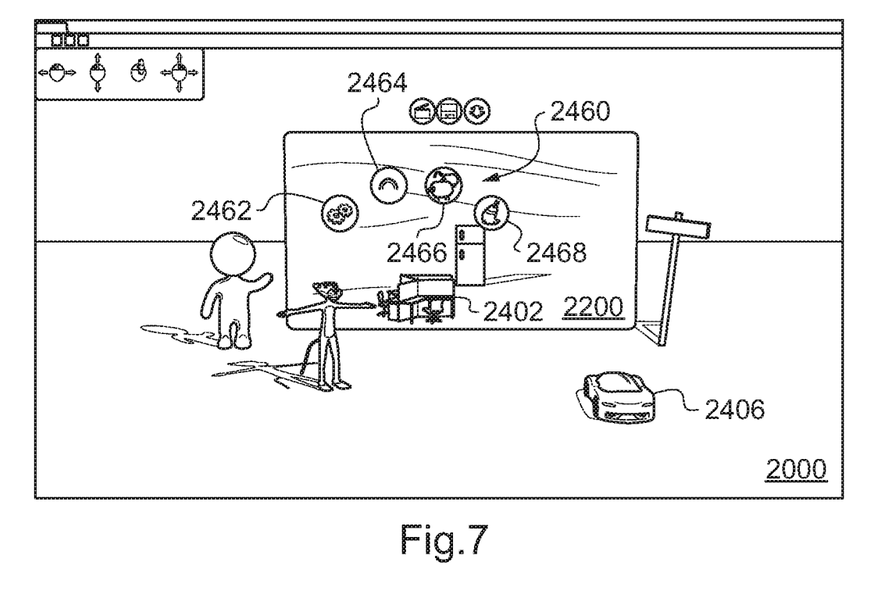

Referring to FIG. 7, the author has selected the object 2304 which is now represented 2406 in the authoring scene. The user is also beginning the displacement of the object 2402 from the 3D authoring scene 2000 to the 3D experience scene 2200: the object is now located in the 3D experience scene and does not belong anymore to the 3D authoring scene.

The user has furthermore triggered the displaying of a set of local tools 2460 once the object 2402 is located in the 3D authoring scene. These tools are called local tools because they are dedicated to the configuration of one object 2402 only. The displaying of these tools may be carried as known in the art, for instance by performing a right click on a haptic device when the cursor is over the object. The local tools 2460 provide a set of user-selectable functions 2462-2468 that may be the same as the user-selectable function 2062-2068 discussed in relation with FIG. 3. Similarly, each user-selectable function 2462-2468 of the set of local tools 2460 may be an object whose representation is displayed in the 3D authoring scene. Moreover, as depicted on FIG. 7, the local tools 2460 can also be displayed in the 3D experience scene. Moreover, the set of tools may also be called while the object is in the 3D experience scene.

Figure 8:
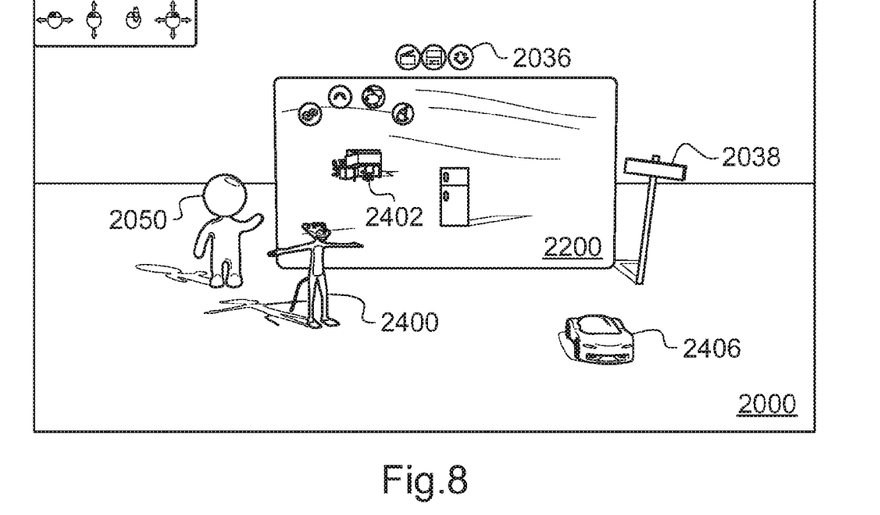

Referring to FIG. 8, the object 2402 is now immersed in the 3D experience scene 2200, that is, the displacement is over. In other terms, the object 2402 has been dropped in the 3D experience scene.

It is to be understood that opposite displacements of representations of objects may be contemplated, that is, displacing an object located in the 3D experience scene to the 3D authoring scene.

Figure 9:
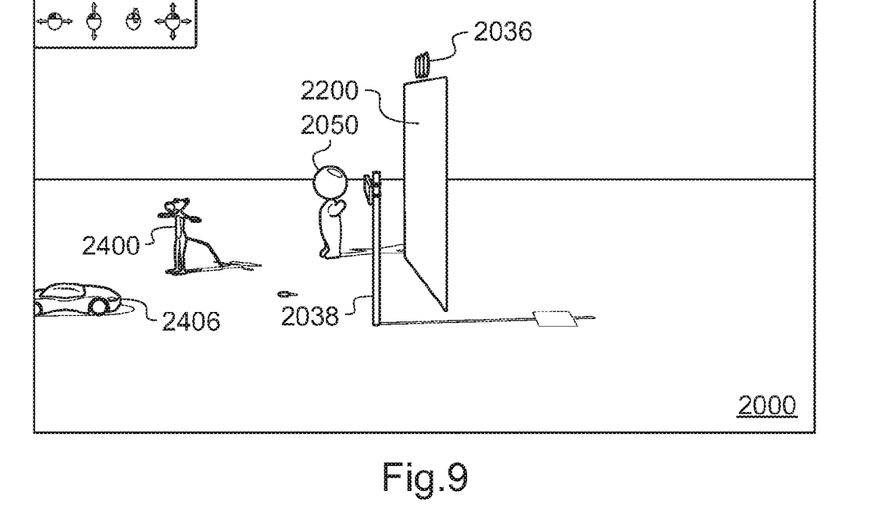

FIG. 9 shows the same 3D authoring 2000 and experience 2200 scenes as in FIG. 8, excepted that the viewpoint has been changed. The 3D representations of the 3D modeled objects 2036, 2050, 2038, 2400, and 2406 are the same than the ones displayed in FIG. 8, excepted that they are shown with the new viewpoint.

Referring now to FIG. 1, the author may want to modify the position or the configuration of one of the objects displaced in the 3D experience scene.

At step 240, the author may decide to enter the 3D experience scene so that he sees only the 3D experience scene. For entering the 3D experience scene, the author may trigger the dedicated function represented by the object 2036 of the global tool: the viewpoint enters the experience scene for displaying only the experience scene and the representations of objects displaced thereon. The viewpoint in the 3D authoring scene and the viewpoint in the 3D experience scene are thus independent.

Figure 10:
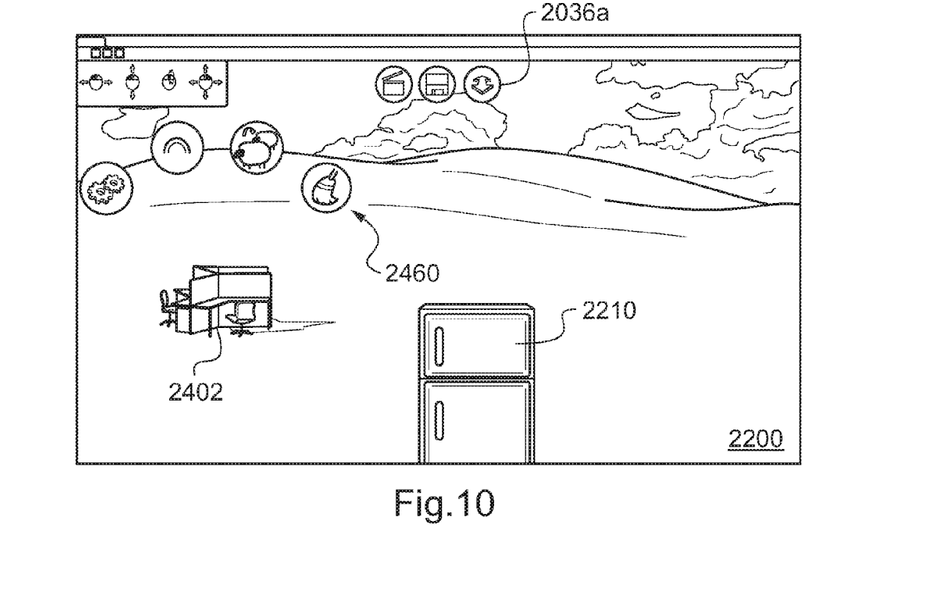

FIG. 10 shows an example of a view in the GUI wherein only the 3D experience scene 2200 is displayed. The author is completely immersed in the experience scene, which means that whatever the viewpoint, the author will not see the portal and the 3D authoring scene. The author can escape the 3D experience scene by triggering the function represented by the icon 2036a. One understands that the icon 2036a is not the object 2036 depicted in FIG. 2: indeed, the object 2036 would be part of the 3D experience scene only if the author would displace it thereon.

Next at step 250, the author may use one of the local tools 2460 in order to configure the object 2402 represented on FIG. 10. The configuration of the object involves, but is not limited to, the types and locations of light sources, the colour, texture and/or material composition which affect how the object is rendered, the behaviour of the object, and so on. The behaviour of an object comprises the actions the user will be allowed to carry out on the object when playing the playable scene. The behaviour may further define the interactions between the object and at least one other object. For instance, if an object comes near the fridge 2210, its door may open.

Then, at step 260, the author organizes the displaced representations of objects in the 3D experience scene in order to create the playable scene. Organizing means that the representations of the objects displaced in the 3D experience scene are arranged according to the planning of the author. The organization involves notably the location of the objects in the 3D experience scene, but also their configuration and behaviour.

It is to be understood that the foregoing method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Figure 12:
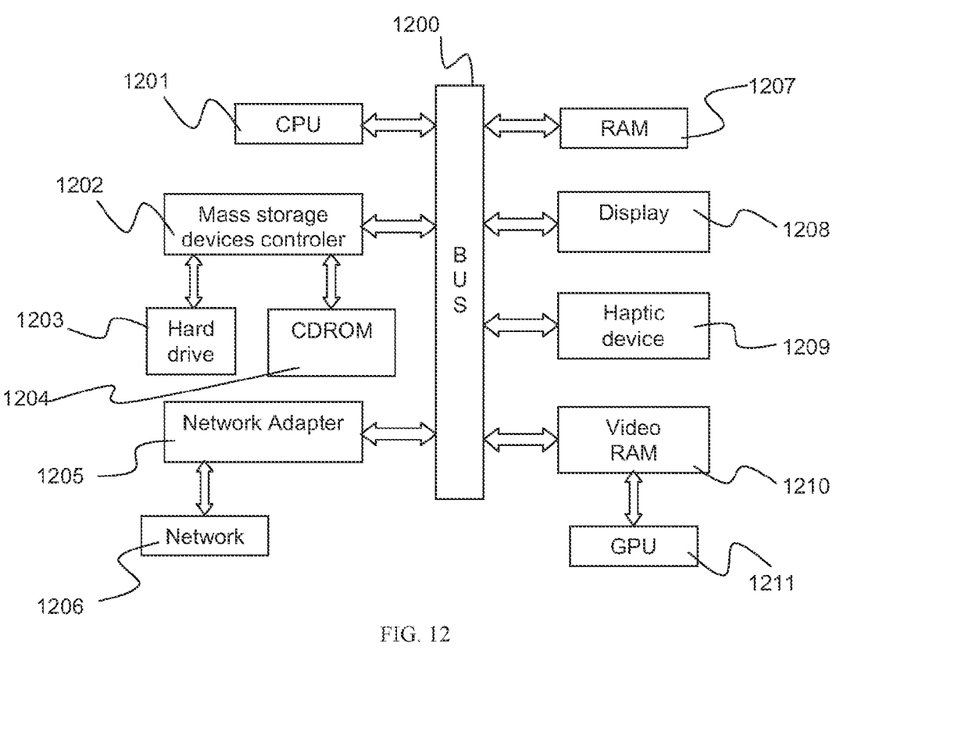
FIG. 12 is a schematic view of a client workstation architecture adapted for carrying out the invention.

FIG. 12 shows a client computer system, e.g. a workstation of a user. The client computer comprises a central processing unit (CPU) 1201 connected to an internal communication BUS 1200, a random access memory (RAM) 1207 also connected to the BUS. The client computer is further provided with a graphical processing unit (GPU) 1211 which is associated with a video random access memory 1210 connected to the BUS. Video RAM 1210 is also known in the art as frame buffer. A mass storage device controller 1202 manages accesses to a mass memory device, such as hard drive 1203. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1204. Any of the foregoing may be supplemented by, or incorporated in, specially designed ASICs (application-specific integrated circuits). A network adapter 1205 manages accesses to a network 1206. The client computer may also include a haptic device 1209 such as cursor control device, a keyboard or the like. A cursor control device is used in the client computer to permit the user to selectively position a cursor at any desired location on display 1208. In addition, the cursor control device allows the user to select various commands, and input control signals. The cursor control device includes a number of signal generation devices for input control signals to system. Typically, a cursor control device may be a mouse, the button of the mouse being used to generate the signals.

The preferred embodiment of the present invention has been described. It will be understood that various modifications may be made without departing from the spirit and scope of the invention. Therefore, other implementations are within the scope of the following claims.

The invention claimed is:

1. A computer-implemented process for creating a playable scene with an authoring system, the process comprising the steps of:
   in a first computer system:
   displaying a three-dimensional authoring scene comprising representations of objects displayed thereon, one of the representations of objects being a three-dimensional experience scene configured (i) to facilitate at least an author creating a playable scene thereon using the first computer system, and (ii) to facilitate an end-user playing the playable scene thereon using a second computer system;
   displacing, upon user action, some of the representations of objects displayed in the authoring scene to the experience scene;
   organizing, upon user action, the displaced representations of objects in the experience scene so as to create a playable scene; and
   configuring, upon user action, configurations of objects represented in the three-dimensional authoring scene or in the three-dimensional experience scene, the configuration of an object being unchanged when displaced from the authoring scene to the experience scene, the configuration of an object comprises a behavior of the object with at least another object.

2. The process of claim 1, further comprising the step of:
   computing an instance for each one of the objects to be displayed in the authoring scene; and
   wherein the step of displacing further comprises displacing without duplication the representations of objects.

3. The process of claim 1, wherein a change of a viewpoint in the three-dimensional authoring scene affects the viewpoint in the three-dimensional experience scene accordingly.

4. The process of claim 1, wherein the viewpoint in the three-dimensional authoring scene is independent to the viewpoint in the three-dimensional experience scene.

5. The process of claim 1, further comprising the step of:
   displaying, upon user action, a set of local tools in the authoring scene or in the experience scene for configuring an object represented in the authoring scene or in the experience scene.

6. The process of claim 1, further comprising the step of:
   displaying a set of global tools for configuring the three-dimensional authoring scene or the three-dimensional experience scene.

7. The process of claim 5, wherein the local tools or the global tools are objects whose respective representations are displayed.

8. The process of claim 1, wherein at the step of organizing, the viewpoint enters the experience scene for displaying only the experience scene and the representations of objects displaced thereon.

9. The process of claim 1, wherein the step of displaying representations is carried out at a build-time, and the steps of displacing and organizing are carried out at a run-time.

10. The process of claim 1, wherein the objects are three-dimensional modeled objects.

11. A non-transitory computer readable storage medium having recorded thereon a computer program for creating with an authoring system a playable scene, the computer program comprising code means for causing a first computer to take the steps of:
   displaying a three-dimensional authoring scene comprising representations of objects displayed thereon, one of the representations of objects being a three-dimensional experience scene configured (i) to facilitate at least an author creating a playable scene thereon using the first computer system, and (ii) to facilitate an end-user playing the playable scene thereon using a second computer system;
   displacing, upon user action, some of the representations of objects displayed in the authoring scene to the experience scene;
   organizing, upon user action, the displaced representations of objects in the experience scene; and
   configuring, upon user action, configurations of objects represented in the three-dimensional authoring scene or in the three-dimensional experience scene, the configuration of an object being unchanged when displaced from the authoring scene to the experience scene, the configuration of an object comprises a behavior of the object with at least another object.

12. An authoring system for creating a playable scene, the authoring system comprising:
a first computer system; and
a display, associated with the first computer, for displaying a three-dimensional authoring scene comprising representations of objects displayed thereon, one of the representations of objects being a three-dimensional experience scene configured (i) to facilitate at least an author creating a playable scene thereon using the first computer system, and (ii) to facilitate an end-user playing the playable scene thereon using a second computer system;
a haptic device for displacing, upon user action, some of the representations of objects displayed in the authoring scene to the experience scene;
the first computer system configured to organize, upon user action on the haptic device, the displaced representations of objects in the experience scene; and
the first computer system configured to organize, upon user action, configurations of objects represented in the three-dimensional authoring scene or in the three-dimensional experience scene, the configuration of an object being unchanged when displaced from the authoring scene to the experience scene, the configuration of an object comprises a behavior of the object with at least another object.

* * * * *